US011326058B2

(12) United States Patent
Takachi (10) Patent No.: US 11,326,058 B2
(45) Date of Patent: May 10, 2022

(54) OPTICAL MEMBER AND OPTICAL INSTRUMENT

(71) Applicant: CANON KABUSHIKI KAISHA, Tokyo (JP)

(72) Inventor: Miwa Takachi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 136 days.

(21) Appl. No.: 16/531,312

(22) Filed: Aug. 5, 2019

(65) Prior Publication Data

US 2020/0056053 A1 Feb. 20, 2020

(30) Foreign Application Priority Data

Aug. 14, 2018 (JP) .............................. JP2018-152729
Jul. 24, 2019 (JP) .............................. JP2019-136310

(51) Int. Cl.
| | |
|---|---|
| *C09D 1/00* | (2006.01) |
| *C09D 5/00* | (2006.01) |
| *C09D 7/62* | (2018.01) |
| *G02B 1/18* | (2015.01) |
| *C01B 33/12* | (2006.01) |
| *H04N 5/225* | (2006.01) |
| *H04N 7/18* | (2006.01) |

(52) U.S. Cl.
CPC ............... *C09D 5/00* (2013.01); *C01B 33/12* (2013.01); *C09D 1/00* (2013.01); *C09D 7/62* (2018.01); *G02B 1/18* (2015.01); *H04N 5/2253* (2013.01); *H04N 5/2254* (2013.01); *H04N 7/183* (2013.01)

(58) Field of Classification Search
CPC ... C08K 9/06; C09D 1/00; C09D 5/00; G02B 1/18
See application file for complete search history.

(56) References Cited

U.S. PATENT DOCUMENTS

| 4,080,476 A * | 3/1978 | Laskey ............ B29D 11/00865 |
| | | 428/413 |
| 6,156,409 A | 12/2000 | Doushita et al. |
| 2012/0088106 A1 * | 4/2012 | Jing ......................... C09D 7/62 |
| | | 428/426 |
| 2013/0224478 A1 * | 8/2013 | Jing ......................... C08J 7/054 |
| | | 428/331 |

FOREIGN PATENT DOCUMENTS

| JP | 11-100234 A | 4/1999 |
| JP | 2008-272936 A | 11/2008 |
| JP | 2017-39928 A | 2/2017 |
| JP | 2018-75800 A | 5/2018 |

* cited by examiner

*Primary Examiner* — Sheeba Ahmed
(74) *Attorney, Agent, or Firm* — Venable LLP (57) ABSTRACT

Provided are an optical member including a substrate and a porous layer on the substrate, in which the porous layer includes a silica particle, a silanol group included in the silica particle at a surface of the porous layer is substituted with a functional group included in a divalent organic group having a specific number of atoms and a specific hydrophilic group, and a molar ratio of the divalent organic group to the silanol group on the surface of the porous layer as expressed by the formula of divalent organic group/silanol group is in a range of more than 0.25 and 1.5 or less, an optical instrument including the optical member, and a method for producing an optical member which includes a substrate and a porous layer on the substrate, the method including a coating liquid applying step, a drying and curing step, and an organic chain substituting step.

20 Claims, 2 Drawing Sheets

OPTICAL MEMBER AND OPTICAL INSTRUMENT

BACKGROUND OF THE INVENTION

Field of the Invention

The present invention relates to an optical member and an optical instrument such as a surveillance camera.

Description of the Related Art

Currently, a surveillance camera is used in various places such as a store, a hotel, a bank, and a station, for the purpose of crime-prevention and the like. A camera cover is attached to a main body of the surveillance camera for protection from various environments, and an acrylic resin material or a polycarbonate resin material has been used in the main body from the viewpoint of transparency or impact resistance. There are many cases where the surveillance camera is installed outdoors, and in case of rain, water droplets adhere to the camera cover in a spherical shape, and the camera cover becomes foggy, which has a bad influence on a captured image. Therefore, a technology which enhances an antifogging effect to reduce the bad influence on the captured image in case of rain by forming a hydrophilic film on a surface of the camera cover to form the water droplets into a liquid film in a case where the water droplets are attached to the camera cover is known.

A general product packaging form of the surveillance camera includes packaging the camera main body and the camera cover in the same package and storing and transporting the package. In this case, a hydrophobic siloxane-based contaminant is generated from components which constitute the camera main body, in particular, from rubber components. The siloxane-based contaminant is a trimeric to decameric cyclic siloxane having high volatility, and in particular, the contaminant is a tetrameric or a pentameric cyclic siloxane in many cases. By adsorption of the siloxane-based contaminant onto a surface of the hydrophilic film on the surface of the camera cover, hydrophilicity deteriorates. Furthermore, in a case where the surveillance camera is in an outdoor exposure environment, the hydrophilic film easily changes and deteriorates by being exposed to sunlight and rain for a long period of time, and hydrophilicity deteriorates by adsorbing a hydrophobic organic contaminant or the like that exists in the outdoor environment. For the aforementioned reasons, as a hydrophilic film formed on a camera cover, it is required to maintain hydrophilicity in any of an environment of the product packaging form in which the siloxane-based contaminant exists and an environment in which the camera is exposed outdoors after being installed.

In Japanese Patent Application Laid-Open No. H11-100234, an antifogging article that enhances an antifogging performance and an antifouling effect by thinly coating an uneven surface of a silica particle with an organosilane having low polarity (including a functional group such as a polyalkylene oxide group, an alkyl group, an alkenyl group, and an aryl group) is described.

In Japanese Patent Application Laid-Open No. H11-100234, the antifogging performance and the antifouling effect are enhanced by using the organosilane having low polarity, however, in a case where the organosilane having low polarity is used, hydrophilicity decreases. Therefore, there is a problem in that the antifogging effect is not sufficiently achieved.

SUMMARY OF THE INVENTION

An object of the present invention is to provide an optical member having a surface that can maintain hydrophilicity for a long period of time in any of an environment of a package storing form in which the siloxane-based contaminant exists and an outdoor exposure environment.

An optical member according to the present invention includes a substrate and a porous layer on the substrate, in which the porous layer includes a silica particle, a silanol group included in the silica particle at a surface of the porous layer is substituted with a functional group included in a divalent organic group, the number of atoms in a molecular chain of the divalent organic group is 3 or more and 10 or less, the divalent organic group has a hydrophilic group, and a molar ratio of the divalent organic group to the silanol group on the surface of the porous layer as expressed by the formula of divalent organic group/silanol group is in a range of more than 0.25 and 1.5 or less.

In addition, an optical instrument according to the present invention includes the optical member.

Furthermore, a method for producing an optical member according to the present invention is a method for producing an optical member which includes a substrate and a porous layer on the substrate, the method including: a coating liquid applying step of applying a coating liquid containing a silica particle and a solvent onto the substrate; a drying and curing step of drying and/or curing the substrate onto which the coating liquid is applied; and an organic chain substituting step of substituting a silanol group included in the silica particle with a functional group using a solution containing a precursor of a divalent organic group having a hydrophilic group and the functional group, in which in the substituting, a reaction condition is controlled so that a molar ratio of the divalent organic group to the silanol group on a surface of the porous layer as expressed by the formula of divalent organic group/silanol group is in a range of more than 0.25 and 1.5 or less, the number of atoms in a molecular chain of the divalent organic group is 3 or more and 10 or less, and the divalent organic group has the hydrophilic group at a terminal thereof.

According to the present invention, an optical member that can maintain hydrophilicity for a long period of time in any of an environment of a package storing form in which a siloxane-based contaminant exists and an outdoor exposure environment is provided.

In addition, according to the present invention, an optical instrument excellent in antifogging properties is provided.

Furthermore, according to the present invention, a method for producing an optical member by which the optical member is produced is provided.

Further features of the present invention will become apparent from the following description of exemplary embodiments with reference to the attached drawings.

DESCRIPTION OF THE EMBODIMENTS

Hereinafter, the present invention will be described in detail.

[Optical Member]

Figure 1A:
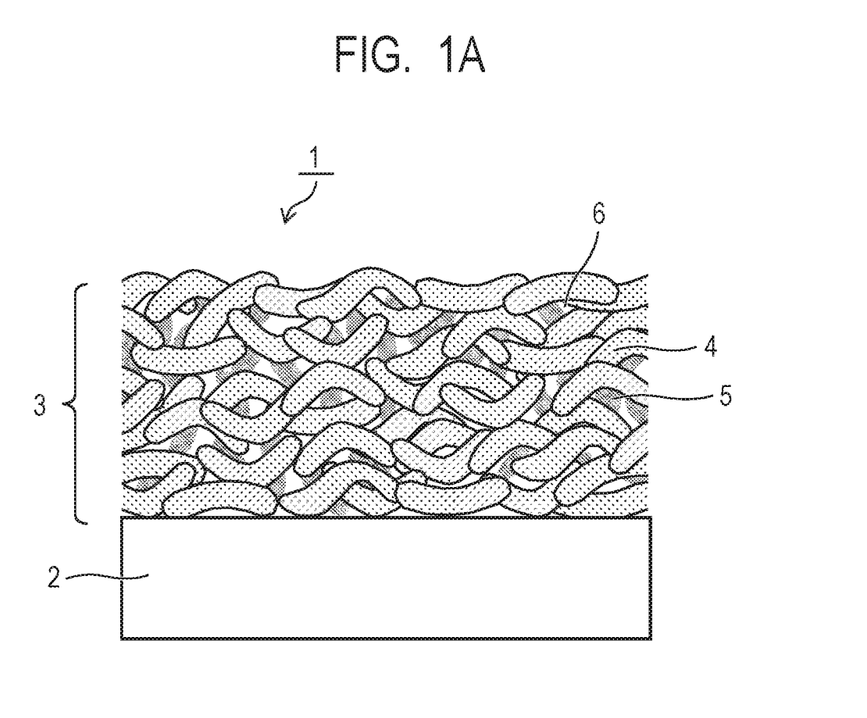
FIG. 1A is a schematic diagram illustrating a configuration of an optical member according to an embodiment of the present invention.
Figure 1B:
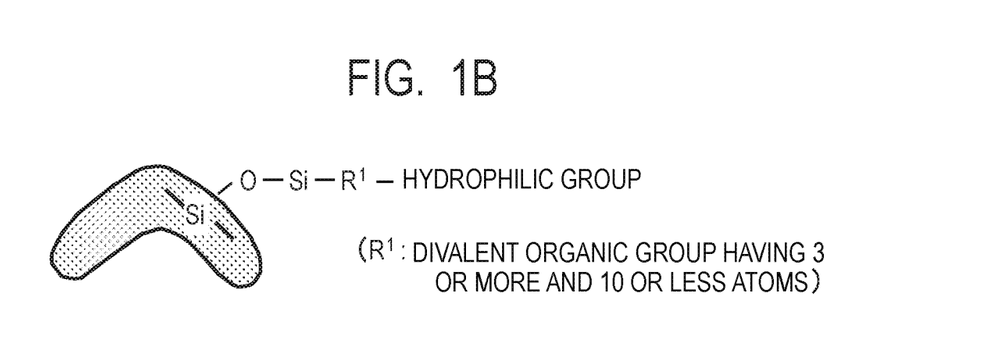
FIG. 1B is a schematic diagram illustrating a silica particle at a surface of a porous layer included in the optical member according to the embodiment of the present invention.

FIGS. 1A and 1B are schematic diagrams illustrating an optical member according to an embodiment of the present invention. As illustrated in FIG. 1A, an optical member 1 includes a porous layer 3 on a substrate 2, and the porous layer 3 includes silica particles 4 and a binder 5. A plurality of voids 6 are formed in a portion formed of the binder 5.

The silica particles 4 in the porous layer 3 are chemically or physically bonded to each other through the binder 5. In addition, as illustrated in FIG. 1B, the optical member has a structure in which some silanol (Si—OH) groups included in the silica particles at a surface of the porous layer are substituted with functional groups included in divalent organic groups, and the divalent organic group has a molecular chain having 3 or more and 10 or less atoms. Furthermore, the divalent organic group has a hydrophilic group at a terminal thereof. FIG. 1B illustrates bonding in a case where the divalent organic group has a siloxy group as an example of the functional group.

It is considered that, in an environment in which a siloxane-based contaminant exists, the divalent organic group having the functional group that substitutes for the silanol group included in the silica particle causes steric hindrance and suppresses adhesion of the siloxane-based contaminant to the silanol group in the particle surface, thereby contributing to maintenance of hydrophilicity. For this, the divalent organic group having the functional group that substitutes for the silanol group included in the silica particle at the surface of the porous layer has the molecular chain having 3 or more and 10 or less atoms. In a case where the number of atoms in the divalent organic group is 3 or more, steric hindrance is caused, and adhesion of the siloxane-based contaminant to the silanol group can be suppressed. Also, in a case where the number of atoms is 10 or less, it is possible to suppress hydrophobization of the surface of the porous layer due to hydrophobicity of a divalent organic group moiety and hydrophobization of the surface of the porous layer due to loss of the hydrophilic group included in the divalent organic group by degradation of the divalent organic group moiety in an outdoor exposure environment.

Examples of the divalent organic group include an alkyl group, a dialkylether group, and the like.

The hydrophilic group included in the divalent organic group is a group that does not bond to the siloxane-based contaminant. The hydrophilic group can be, for example, at least one group selected from the group consisting of a hydroxy group, an aldehyde group, a nitrile group, a nitro group, a carboxyl group, a sulfone group, an amino group, and a phosphonic acid group.

Furthermore, the hydrophilic group is bonded to the terminal of the divalent organic group in order to keep the hydrophilicity of the surface of the porous layer high.

In a case where the number of atoms in a main chain of the divalent organic group having the hydrophilic group is 3 or more and 10 or less, the divalent organic group may have a branched chain.

The divalent organic group may further have a hydrophilic group at a site other than the terminal thereof, in order to increase hydrophilicity of the optical member. As the hydrophilic group, any hydrophilic group can be used, insofar as the hydrophilic group does not impair the effect of the present invention. The hydrophilic group that the divalent organic group has at the site other than the terminal thereof can be, for example, at least one group selected from the group consisting of a hydroxy group, an aldehyde group, a nitrile group, an imino group, a nitro group, a ketone group, a carboxyl group, a sulfone group, an amino group, and a phosphonic acid group.

Examples of the functional group that substitutes for the silanol group include a siloxy group, a hydroxy group, an aldehyde group, a nitrile group, an imino group, a nitro group, and a ketone group. A siloxy group is particularly preferable from the viewpoint of ease of introduction.

A molar ratio of the divalent organic groups to the silanol groups detected from a surface of the optical member (divalent organic groups/silanol groups) is preferably in a range of more than 0.25 and 1.5 or less. In a case where the molar ratio of the divalent organic groups to the silanol groups (divalent organic groups/silanol groups) is more than 0.25, adhesion of the siloxane-based contaminant in a package storing form to the silica particle surface can be effectively suppressed. Also, in a case where the molar ratio of the divalent organic groups to the silanol groups (divalent organic groups/silanol groups) is 1.5 or less, high hydrophilicity, which is attributable to the silanol group included in the silica particle, can be maintained. Furthermore, it is possible to suppress hydrophobization of the surface of the porous layer due to degradation of the divalent organic group moiety in the outdoor exposure environment and loss of the hydrophilic group included in the divalent organic group. The molar ratio of the divalent organic groups to the silanol groups on the surface of the porous layer can be quantified by conducting qualitative analysis by TOF-SIMS or the like and then conducting analysis by X-ray photoelectron spectroscopy (XPS).

The optical member according to the present invention can be packaged with a member generating the siloxane-based contaminant and can be used in another optical member which requires an antifogging performance. Examples of another optical member can include an optical film, an optical filter, a sensor, an antireflection plate, a protection cover such as a cover for a surveillance camera, a shield of a helmet, and the like.

Hereinafter, each constituent of the optical member according to the present invention will be described in detail.

<Substrate>

As the substrate, an acrylic resin, a polycarbonate resin, a polyester resin, glass, or the like can be used. A shape of the substrate 2 is not limited and may be a plate shape, may be a film shape, and may be a planar, curved, or dome shape.

<Porous Layer>

The porous layer on the substrate includes silica particles. The silica particles are preferably bonded to each other through a binder. A refractive index of the porous layer is lower than a refractive index of the silica particles only due to the air (refractive index 1.0) included in the voids formed in the portion formed of the binder. The voids may be single pores or continuous pores.

A thickness of the porous layer including the silica particles is preferably 350 nm or more and 2,000 nm or less. By setting the thickness of the layer to 350 nm or more and 2,000 nm or less, a hydrophobic organic contaminant or the like existing in the outdoor exposure environment is entrained into the inside of the porous layer, and hydrophilicity of the surface of the layer can be maintained.

A contact angle of the surface of the porous layer with respect to water (hereinafter, referred to as a contact angle) is preferably less than 30°, from the viewpoint of having high antifogging properties as the optical member.

<Silica Particles>

The silica particles are preferably spherical silica particles of which a particle diameter is 5 nm or more and 100 nm or less or chain silica particles of which a short diameter is 5 nm or more and 30 nm or less, and a long diameter is 30 nm or more and 200 nm or less. The spherical silica particles and the chain silica particles may be each independently used or may be used by being mixed with each other. By setting the particle diameter of the spherical silica particles and the short diameter and the long diameter of the chain silica particles within the range described above, the voids between the silica particles can be maintained to be large enough to prevent occurrence of haze. Therefore, the optical member that can maintain hydrophilicity by entrainment of the hydrophobic organic contaminant or the like existing in the outdoor exposure environment into the inside of the porous layer and has excellent light transmittance can be realized.

Here, the particle diameter of the silica particles is an average Feret diameter. The average Feret diameter can be measured by performing image processing on an image obtained by observing a transmission electron microscope image. As an image processing method, commercially available image processing such as Image Pro PLUS (manufactured by Media Cybernetics, Inc.) can be used. The average Feret diameter can be obtained by performing suitable contrast control in a predetermined image region as necessary, measuring the average Feret diameter of each particle by particle measurement, and calculating an average value. In addition, the particle diameters of the short diameter and the long diameter of the chain silica particles can be obtained by measurement by dynamic light scattering, in a case of a solution obtained by dispersing the chain silica particles in a solvent.

The silica particles can be used by being mixed with a metal oxide such as $Al_2O_3$, $TiO_2$, $ZnO_2$, and $ZrO_2$.

Silica particles in which the silanol group remains on the surface thereof are preferable as the silica particles, from the viewpoint of rendering the surface of the porous layer hydrophilic.

As described above, the surface of the porous layer on which the silanol group and the divalent organic group are present can be obtained by substituting some of the silanol groups included in the silica particles at the surface of the porous layer with the functional groups included in the divalent organic groups.

<Binder>

The binder is preferably formed of a material that bonds the silica particles to each other by forming a siloxane bond between the silica particles. It is more preferable to use a hydrolytic condensate of an alkoxysilane as such material, since affinity thereof with the silica particles is high. The hydrolytic condensate of an alkoxysilane can be prepared by hydrolyzing an alkoxysilane and then performing condensation.

The alkoxysilane which is a precursor of the hydrolytic condensate of an alkoxysilane is not compatible with water, and thus, two layers of the alkoxysilane and water are in a state of being separated in the initial stage of the reaction. As the reaction proceeds, the alkoxysilane becomes silanol due to hydrolysis of an alkoxy group and dissolves in the water layer, and therefore, the two layers are uniformly mixed. For preparation of a solution containing the hydrolytic condensate of an alkoxysilane, it is preferable to use 5 to 20 equivalents of water with respect to the alkoxysilane. An acid or a base may be added as a catalyst in order to promote the hydrolysis. As the catalyst, a catalyst containing one or two or more acids or a base selected from the group consisting of sulfuric acid, hydrochloric acid, nitric acid, phosphoric acid, ammonia, phosphinic acid, and phosphonic acid is preferably used at a concentration of 1 mass % or less. When preparing the hydrolytic condensate of an alkoxysilane, a reaction temperature is preferably more than 5° C. and 30° C. or less. In a case where the reaction temperature is more than 5° C., productivity is increased, since hydrolysis of the hydrolytic condensate of an alkoxysilane is completed in a short period of time. In addition, by setting the reaction temperature to be 30° C. or less, a condensation reaction of a hydrolysate of an alkoxysilane adequately proceeds, and excessive growth of the hydrolytic condensate of an alkoxysilane can be suppressed. Therefore, the voids formed between the silica particles in the porous layer can be of an adequate size, and scattering can be suppressed.

The extent of the hydrolysis and the condensation reaction of an alkoxysilane can be evaluated using an average particle diameter of the hydrolytic condensate of an alkoxysilane. It is preferable that the average particle diameter of the hydrolytic condensate of an alkoxysilane when performing measurement on a reaction solution containing an alkoxysilane and water using a dynamic light scattering method is 8 nm to 30 nm. It is more preferable that the average particle diameter is 8 nm to 15 nm.

Examples of the alkoxysilane can include a trifunctional silane of which a methyl group is modified, such as methyltriethoxysilane and methyltrimethoxysilane, and a tetrafunctional silane such as tetraethoxysilane. In addition, one or two or more alkoxysilanes may be used, and a mixture of the trifunctional silane and the tetrafunctional silane may be used. It is particularly preferable that tetraethoxysilane is used in order to increase a probability of forming a siloxane bond with the silica particles.

A content of the binder is preferably 2 mass % or more and 30 mass % or less and more preferably 3 mass % or more and 20 mass % or less, with respect to the porous layer.

<Production Method>

Next, an example of a method for producing an optical member according to the present invention will be described.

The method for producing an optical member according to the present invention includes a coating liquid applying step, a drying and curing step, and an organic chain substituting step. The coating liquid applying step is a step of applying a coating liquid containing silica particles and a solvent onto a substrate. The drying and curing step is a step of drying and/or curing the substrate onto which the coating liquid is applied. The organic chain substituting step is a step of substituting a silanol group included in the silica particle with a functional group using a solution containing a precursor of a divalent organic group having a hydrophilic group and the functional group.

(Coating Liquid Applying Step)

As the substrate, a substrate which is the same as the substrate included in the optical member according to the present invention described above can be used.

As the silica particles contained in the coating liquid, spherical silica particles of which a particle diameter is 5 nm or more and 100 nm or less or chain silica particles of which a short diameter is 5 nm or more and 30 nm or less and a long diameter is 30 nm or more and 200 nm or less are preferable.

A concentration of the silica particles in the coating liquid is not particularly limited as long as a porous layer having a thickness within the range of 350 nm or more and 2,000 nm or less can be formed and can be suitably selected according to the solvent and conditions for forming the layer, however, the concentration of the silica particles is particularly preferably 2 mass % or more and 20 mass % or less.

The coating liquid may contain an additive such as a silane coupling agent and a surfactant, in order to improve dispersibility of the silica particles. However, in a case where these additives and the silanol groups in surfaces of the silica particles react with each other, bonds between the silica particles and the binder become weak, and wear resistance of the porous layer decreases. For this reason, a concentration of the additive such as a silane coupling agent and a surfactant is preferably 10 parts by mass or less and more preferably 5 parts by mass or less, with respect to 100 parts by mass of the silica particles.

The coating liquid may also be a solution obtained by mixing a dispersion, which is obtained by dispersing the silica particles in a solvent, and a binder solution containing a component that forms the binder. The component that forms the binder is preferably the hydrolytic condensate of an alkoxysilane which can form a siloxane bond between particles. The hydrolytic condensate of an alkoxysilane is prepared by hydrolyzing and condensing an alkoxysilane which is the precursor of the hydrolytic condensate of an alkoxysilane, as described above.

Examples of the alkoxysilane can include a trifunctional silane of which a methyl group is modified, such as methyltriethoxysilane and methyltrimethoxysilane, and a tetrafunctional silane such as tetraethoxysilane. In addition, a mixture of the trifunctional silane and the tetrafunctional silane may be used as the alkoxysilane. It is particularly preferable that the tetrafunctional silane is used, since a probability of forming the siloxane bond at the contact point between the particles is increased by increasing the silanol groups, and strength of the porous layer increases.

A concentration of the component that forms the binder can be suitably selected according to the concentration of the silica particles. A weight ratio of the component that forms the binder to the silica particles when expressed in terms of silica is preferably 3 mass % or more and 15 mass % or less. In a case where the weight ratio is 3 mass % or more, strength adequate for the porous layer is achieved, and in a case where the weight ratio is 15 mass % or less, generation of a crack can be avoided even in an outdoor exposure environment.

The solvents that can be used in the coating liquid and the binder solution may be any solvents as long as a raw material is uniformly dissolved or dispersed in the solvent, and a reactant is not precipitated in the solvent. Examples of the solvent include monohydric alcohols such as methanol, ethanol, 1-propanol, 2-propanol, 1-butanol, 2-butanol, 2-methylpropanol, 1-pentanol, 2-pentanol, cyclopentanol, 2-methylbutanol, 3-methylbutanol, 1-hexanol, 2-hexanol, 3-hexanol, 4-methyl-2-pentanol, 2-methyl-1-pentanol, 2-ethylbutanol, 2,4-dimethyl-3-pentanol, 3-ethylbutanol, 1-heptanol, 2-heptanol, 1-octanol, and 2-octanol; dihydric or higher alcohols such as ethylene glycol and triethylene glycol; ether alcohols such as methoxyethanol, ethoxyethanol, propoxyethanol, isopropoxyethanol, butoxyethanol, 1-methoxy-2-propanol, 1-ethoxy-2-propanol, and 1-propoxy-2-propanol; ethers such as dimethoxyethane, diglyme, tetrahydrofuran, dioxane, diisopropyl ether, dibutyl ether, and cyclopentyl methyl ether; esters such as ethyl formate, ethyl acetate, n-butyl acetate, ethylene glycol monomethyl ether acetate, ethylene glycol monoethyl ether acetate, ethylene glycol monobutyl ether acetate, and propylene glycol monomethyl ether acetate; various aliphatic hydrocarbons and alicyclic hydrocarbons such as n-hexane, n-octane, cyclohexane, cyclopentane, and cyclooctane; various aromatic hydrocarbons such as toluene, xylene, and ethylbenzene; various ketones such as acetone, methyl ethyl ketone, methyl isobutyl ketone, cyclopentanone, and cyclohexanone; various chlorinated hydrocarbons such as chloroform, methylene chloride, carbon tetrachloride, and tetrachloroethane; and aprotic polar solvents such as N-methyl pyrrolidone, N,N-dimethylformamide, N,N-dimethylacetamide, and ethylene carbonate. Two or more kinds of the solvent can be used by being mixed with each other.

The coating liquid can be applied onto a surface of the substrate using a known method such as a dip coating method, a spin coating method, a spray coating method, a slit coating method, and a printing method.

In a case where an optical member having a complex three-dimensional shape is produced, spin coating by which the optical member having a uniform thickness is produced is preferable.

(Drying and Curing Step)

In the drying and curing step, a dryer, a hot plate, an electric furnace, or the like can be used. A temperature in a case of carrying out the drying and the curing is preferably 20° C. or more and 200° C. or less. In a case where the drying and curing temperature is 20° C. or more, the solvent does not remain, and strength optimal for the porous layer is achieved. In addition, in a case where the temperature is 200° C. or less, generation of a crack can be avoided. The drying and curing temperature is more preferably 150° C. or less.

In a case where the coating liquid and the binder solution are applied onto the substrate in this order, the drying and curing step may be carried out after applying the coating liquid containing the silica particles.

The coating liquid applying step and the drying and curing step described above may be repeatedly carried out multiple times, in order to form the porous layer having a desired thickness.

In the drying and curing step, the silica particles are chemically or directly bonded to each other through the binder, and a single layer is formed.

(Organic Chain Substituting Step)

The organic chain substituting step may be carried out before or after the drying and curing step. In a case where the organic chain substituting step is carried out before the drying and curing step, the solution containing the precursor of the divalent organic group having a hydrophilic group and a functional group (hereinafter, also referred to as an organic chain substituting solution) is mixed into the coating liquid and/or binder solution, and a reaction for substituting the silanol group with the functional group is carried out. At this time, the reaction for substituting the silanol group with the functional group may be carried out before or after the coating liquid applying step. In a case where the organic chain substituting step is carried out after the drying and curing step, the organic chain substituting solution is applied onto a layer formed in the drying and curing step, and the reaction for substituting the silanol group with the functional group is carried out. The organic chain substituting step is preferably carried out after the drying and curing step, from the viewpoints of the strength of the porous layer and substitution efficiency.

Examples of the divalent organic group included in the precursor include an alkyl group, a dialkyl ether group, and the like. The divalent organic group included in the precursor has the hydrophilic group at the terminal thereof.

The number of atoms in a molecular chain of the divalent organic group included in the precursor is 3 or more and 10 or less. The hydrophilic group bonded to the divalent organic group can be, for example, at least one group selected from the group consisting of a hydroxy group, an aldehyde group, a nitrile group, a nitro group, a carboxyl group, a sulfone group, an amino group, and a phosphonic acid group.

Examples of the functional group included in the precursor include a hydroxysilyl group, an alkoxysilyl group, a hydroxy group, an aldehyde group, a nitrile group, an imino group, a nitro group, and a ketone group. A hydroxysilyl group or an alkoxysilyl group on which a hydrolytic condensation reaction is carried out is particularly preferable, from the viewpoint of reactivity with the silanol group. That is, an organosilane compound is preferable as the precursor.

In the organic chain substituting solution, a solvent that is highly compatible with the coating liquid and the binder solution may be used.

A method for applying the organic chain substituting solution onto the layer formed in the drying and curing step is not particularly limited, and a known method such as a dip coating method, a spin coating method, a spray coating method, a slit coating method, and a printing method can be used. The dip coating method is preferable from the viewpoint of reaction efficiency with the silanol group.

In the organic chain substituting step, it is preferable that a reaction condition is controlled so that a molar ratio of the divalent organic groups to the silanol groups on a surface of the porous layer (divalent organic groups/silanol groups) is within the range of more than 0.25 and 1.5 or less. For example, in a case where the solution containing the precursor of the divalent organic group having the hydrophilic group is applied by the dip coating method, dipping time is preferably 3 seconds or more and 300 hours or less and more preferably 24 hours or more and 300 hours or less. In a case where the dipping time is 3 seconds or more, the hydrolytic condensation reaction can be sufficiently carried out, and in a case where the dipping time is 300 hours or less, sufficient unreacted silanol groups can remain. The hydrolytic condensation reaction can be promoted, and the dipping time can be shortened by increasing a temperature of the solution containing the precursor of the divalent organic group having the hydrophilic group.

Drying may further be performed in order to remove the solvent after the organic chain substituting step. Here, in a case where the drying and curing step is not carried out after the organic chain substituting step, it is preferable that the drying and curing step carried out under the conditions required for the formation of the porous layer also serves as a step of drying for removing the solvent.

[Optical Instrument]

An optical instrument according to the present invention includes the optical member according to the present invention described above. Examples of such an optical instrument include various image pickup apparatuses such as an outdoor display, a still camera, a camcorder, and a surveillance camera, a binocular, a telescope, a solar cell, and the like.

Figure 2:
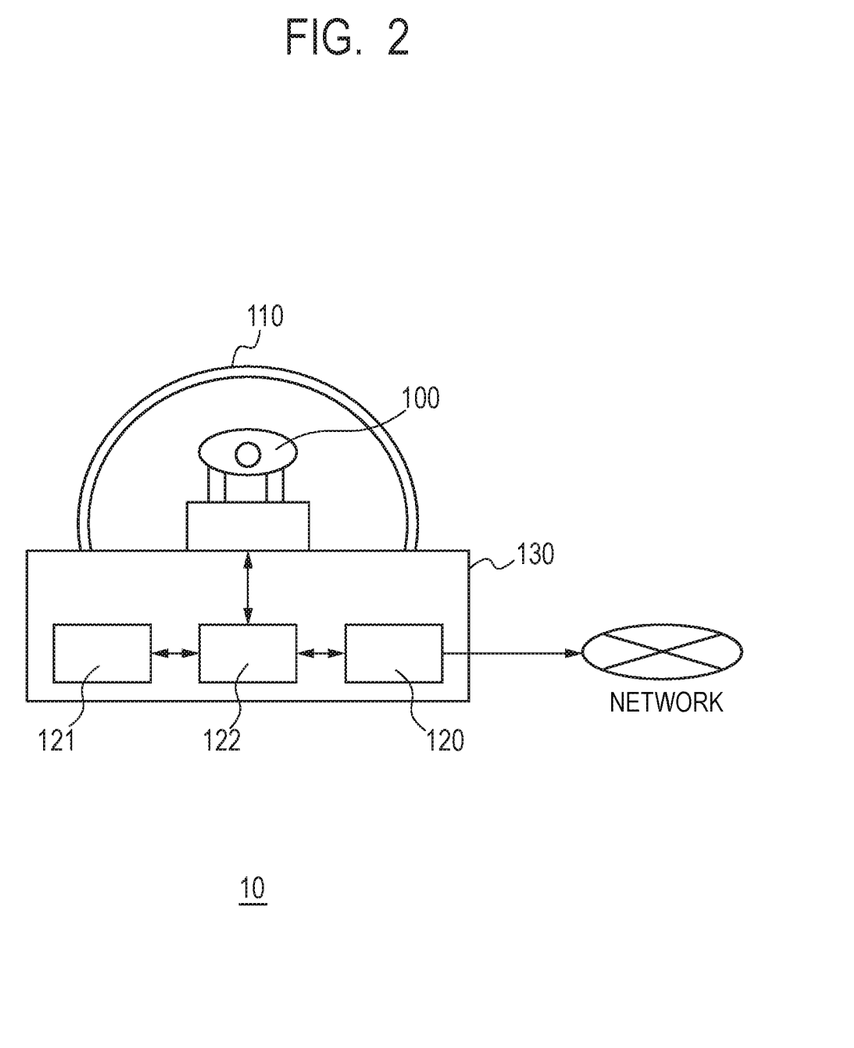
FIG. 2 is a schematic diagram of a surveillance camera, which is an example of an image pickup apparatus according to the present invention.

FIG. 2 is a schematic diagram of a surveillance camera, which is an example of an image pickup apparatus according to the present invention.

A surveillance camera 10 outputs image data obtained by image pickup by a camera unit (image pickup unit) 100 to network via a controller 122 and a unit 120 which transfers data. The image data can be stored by being transferred to a storing unit 121 which stores data via the controller 122. The unit 120 which transfers data, the storing unit 121 which stores data, and the controller 122 are covered with an outer covering 130 in order to prevent impact from the outside and infiltration of moisture. The camera unit 100 is also covered with a camera cover 110 in order to prevent impact from the outside and infiltration of moisture.

The optical member according to the present invention illustrated in FIGS. 1A and 1B is used as the camera cover 110. That is, the camera cover 110 includes the porous layer 3 including the silica particles 4 and the binder 5 on the substrate 2. A transparent member is used as the substrate, in order to enable the image pickup by the camera unit 100. As a material for the substrate, a polycarbonate resin, an acrylic resin, and a polyester resin, which are strong against impact, are preferred.

EXAMPLES

Hereinafter, the present invention will be specifically described using Examples. However, the present invention is not limited to such Examples.

(Preparation of Each Solution)

(1) Dispersion

While adding 1-ethoxy-2-propanol to 500 g of a 2-propanol (IPA) dispersion of chain silica particles (manufactured by Nissan Chemical Corporation; IPA-ST-UP (trade name); average particle diameter: 12 nm•solid content concentration of 15 mass %), IPA was distilled off. As a result, 750 g of a 1-ethoxy-2-propanol dispersion of chain silica particles having a solid content concentration of 10 mass % was prepared.

(2) Binder Solution

To a solution of 62.6 g of ethyl silicate (manufactured by Tokyo Chemical Industry Co., Ltd.) and 36.8 g of 1-ethoxy-2-propanol, 54 g of 0.01 mol/L dilute hydrochloric acid was gradually added, and the mixture was stirred at room temperature for 5 hours, thereby preparing a binder solution having a solid content concentration of 11.8 mass %.

(3) Coating Liquid

To 750 g of the 1-ethoxy-2-propanol dispersion of chain silica particles prepared above, 63 g of the binder solution was gradually added, and then the mixture was stirred at room temperature for 2 hours, thereby preparing a dispersion of chain silica particles.

(4) Organic Chain Substituting Solution 1

To 10 g of 3-(trihydroxysilyl)-1-propanesulfonic acid (SIT8378.3 manufactured by AZmax.co) which is a silane coupling agent having a sulfonic acid group, 40 g of pure water was added for dilution, thereby preparing an organic chain substituting solution 1.

(5) Organic Chain Substituting Solution 2

To 8 g of (3-triethoxysilylpropyl)succinic anhydride (SIT8192.6 manufactured by AZmax.co) which is a silane coupling agent having a precursor of a carboxylic acid group, 6 g of 0.1 weight % phosphoric acid and 12 g of ethanol were added for dilution, thereby preparing an organic chain substituting solution 2. Phosphoric acid was added to cause ring-opening of succinic acid.

(6) Organic Chain Substituting Solution 3

To 10 g of 3-(2-aminoethylamino)propyltrimethoxysilane (A0774 manufactured by Tokyo Chemical Industry Co., Ltd.) which is a silane coupling agent having an amino group, 40 g of pure water was added for dilution, thereby preparing an organic chain substituting solution 3.

(7) Organic Chain Substituting Solution 4

To 10 g of sodium 3-(trihydroxysilyl)propyl methylphosphonate (SIT8378.5 manufactured by AZmax.co) which is a silane coupling agent having a phosphonic acid group, 40 g of pure water was added for dilution, thereby preparing an organic chain substituting solution 4.

(8) Organic Chain Substituting Solution 5

To 0.01 g of n-propyltrimethoxysilane (manufactured by Chisso Corporation), 10 g of polyglycerol methacrylate (manufactured by KISHIDA CHEMICAL Co., Ltd.) was added, thereby preparing an organic chain substituting solution 5.

(9) Organic Chain Substituting Solution 6

Hydroxypolyethyleneoxypropyltriethoxysilane (SIH6188.0 manufactured by AZmax.co) was used as an organic chain substituting solution 6.

(10) Primer Solution

To 0.1 g of 3-(2-aminoethylamino)propyltrimethoxysilane (A0774 manufactured by Tokyo Chemical Industry Co., Ltd.), 100 g of 1-methoxy-2-propanol (manufactured by KANTO KAGAKU, special grade) was added, and the mixture was stirred at room temperature for 10 minutes, thereby preparing a primer solution.

Using the dispersion, the organic chain substituting solutions, and the primer solution described above, optical members according to Examples and Comparative Examples below were produced.

Example 1

Onto a polycarbonate substrate (nd=1.58, vd=30.2) having a diameter (φ) of 50 mm and a thickness of 4 mm, 0.4 mL of the primer solution was dripped, and spin coating was performed at 1,500 rpm for 30 seconds. The substrate was then heated at 90° C. for 10 minutes in a hot air circulating oven. Subsequently, 0.4 mL of the coating liquid was dripped onto the substrate, and spin coating was performed at 2,000 rpm for 20 seconds, and then the substrate was heated at 90° C. for 15 minutes in a hot air circulating oven. Furthermore, the substrate was dipped in the organic chain substituting solution 1 for 10 days. The substrate was then lifted up, and dry air was blown so as to remove the organic chain substituting solution 1 from the member, thereby obtaining an optical member according to Example 1.

Example 2

An optical member according to Example 2 was produced in the same manner as in Example 1, except that the substrate was dipped in the organic chain substituting solution 1 for 3 days instead of being dipped therein for 10 days in Example 1.

Example 3

An optical member according to Example 3 was produced in the same manner as in Example 1, except that the substrate was dipped in the organic chain substituting solution 2 for 3 days instead of being dipped in the organic chain substituting solution 1 for 10 days in Example 1.

Example 4

An optical member according to Example 4 was produced in the same manner as in Example 1, except that the substrate was dipped in the organic chain substituting solution 3 for 3 days instead of being dipped in the organic chain substituting solution 1 for 10 days in Example 1.

Example 5

An optical member according to Example 5 was produced in the same manner as in Example 1, except that the substrate was dipped in the organic chain substituting solution 4 for 3 days instead of being dipped in the organic chain substituting solution 1 for 10 days in Example 1.

Comparative Example 1

The polycarbonate substrate that has been coated with the primer solution and heated, and then coated with the coating liquid and heated as in Example 1 was dipped in the organic chain substituting solution 5 and immediately lifted up at a speed of 5 cm per minute. The substrate was then heated at 90° C. for 10 minutes in a hot air circulating oven. Furthermore, dry air was blown so as to remove the organic chain substituting solution 5 adhering to the member, thereby producing an optical member according to Comparative Example 1.

Comparative Example 2

The substrate was coated with the organic chain substituting solution 1 by spin coating at 1,500 rpm for 30 seconds and heated at 90° C. for 15 minutes in a hot air circulating oven, thereby producing an optical member according to Comparative Example 2.

Comparative Example 3

An optical member according to Comparative Example 3 was produced in the same manner as in Example 1, except that the substrate was dipped in the organic chain substituting solution 6 for 3 days instead of being dipped in the organic chain substituting solution 1 for 10 days in Example 1.

Comparative Example 4

An optical member according to Comparative Example 4 was produced in the same manner as in Example 1, except that the organic chain substitution was not performed in Example 1.

Comparative Example 5

An optical member according to Comparative Example 5 was produced in the same manner as in Example 1, except that the organic chain substituting solution 1 was heated to 50° C., and the substrate was dipped therein for 30 days in Example 1.

[Evaluation of Optical Members]

The optical members obtained in Examples and Comparative Examples above were evaluated by the following method.

(1) Confirmation of Type of Functional Group and Number of Carbon Atoms in Alkyl Group The surface of the porous layer of the optical member was measured using TOF-SIMS (TOF-SIMS IV manufactured by IONTOF GmbH) under the conditions of a primary ion Ge and an accelerating voltage of 25 kV, and the type of the functional group bonded to the silica particles at the surface of the porous layer and the number of carbon atoms in the alkyl group were confirmed.

(2) Calculation of Molar Ratio of Divalent Organic Groups to Silanol Groups on Surface of Porous Layer (Divalent Organic Groups/Silanol Groups)

The surface of the porous layer of the optical member was first qualitatively analyzed by TOF-SIMS and then quantified by analysis by X-ray photoelectron spectroscopy (XPS). In the measurement using XPS (Quantera SXM manufactured by ULVAC-PHI, INCORPORATED), the output of an X-ray was set to 20 kV-100 W. In dimensions of 100 μm×100 μm, the surface of the porous layer was scanned using the X-ray, and photoelectrons thus generated were dispersed. After carrying out background processing on the obtained peak of each element, the molar ratio of the divalent organic groups to the silanol groups (divalent organic groups/silanol groups) was calculated from an integrated intensity of the peak for each of the organic groups that have undergone organic chain substitution with the silanol groups, the peaks being obtained by qualitative analysis by TOF-SIMS.

(3) A contact angle at the time of contacting droplets of 2 μL of pure water with the surface of the porous layer of the optical member in an environment of 23° C. and 50% RH was measured using a fully automatic contact angle meter (DM-701 manufactured by Kyowa Interface Science Inc.) for measuring a contact angle. A case where the contact angle was less than 30° was evaluated as A, and a case where the contact angle was 30° or more was evaluated as B.

The contact angle immediately after producing the optical member was used for the initial state evaluation.

(3-1) Storing Test in Environment in which Siloxane-Based Contaminant Exists

A constant temperature and constant humidity chamber (PL-2KP manufactured by ESPEC CORP.) was used, and the environment inside the chamber was set to a temperature of 60° C. and humidity of 90%. In addition, a vessel into which diluted cyclic tetramer siloxane (D4) was put was placed inside the chamber, and each of the optical members according to Examples and Comparative Examples was left to stand inside the chamber for 500 hours. After leaving the optical members to stand inside the chamber, the contact angle on the surface of the porous layer of each of the optical members was measured as described above, and evaluation was performed.

(3-2) Outdoor Exposure Environment Test

A xenon weather meter (Super Xenon Weather Meter CX75 manufactured by Suga Test Instruments Co., Ltd.) was used for the test. Each of the optical members according to Examples and Comparative Examples was placed in the weather meter. Light irradiation intensity was set to be 180 W/m$^2$, and 18 minutes of light irradiation and spraying of water and one hour and 42 minutes of light irradiation only were set as one cycle. Testing was performed by carrying out 300 cycles in total, for a total of 600 hours. After the test, the contact angle on the surface of the porous layer of each of the optical members was measured as described above, and evaluation was performed.

Evaluation results for each of the optical members according to Examples and Comparative Examples are shown in Table 1.

TABLE 1

| | | | | Hydrophilicity | | | | |
| | | | | Initial state | | Siloxane | | Outdoor exposure environment | |
| | Substituting functional group | Number of carbon atoms | (Divalent organic groups/ silanol groups) | Contact angle [°] | Evaluation | Contact angle [°] | Evaluation | Contact angle [°] | Evaluation |
|---|---|---|---|---|---|---|---|---|---|
| Example 1 | Sulfonic acid group | 3 | 1.1 | 25 | A | 28 | A | 25 | A |
| Example 2 | Sulfonic acid group | 3 | 0.37 | 22 | A | 25 | A | 22 | A |
| Example 3 | Carboxylic acid group | 3 | 0.75 | 26 | A | 29 | A | 26 | A |
| Example 4 | Amino group | 3 | 0.54 | 25 | A | 27 | A | 25 | A |
| Example 5 | Phosphonic acid group | 3 | 0.39 | 27 | A | 29 | A | 27 | A |
| Comparative Example 1 | Polyalkylene oxide group | 3 | 0.25 | 22 | A | 35 | B | 28 | A |
| Comparative Example 2 | Sulfonic acid group | 3 | 0.2 | 20 | A | 40 | B | 21 | A |
| Comparative Example 3 | Hydroxyl group | 15 | 0.43 | 38 | B | 42 | B | 50 | B |
| Comparative Example 4 | None | — | — | 18 | A | 40 | B | 22 | A |
| Comparative Example 5 | Sulfonic acid group | 3 | 1.7 | 34 | B | 35 | B | 43 | B |

In the optical members according to Examples 1 to 5 that satisfy the requirements of the present invention, hydrophilicity of the surfaces of the porous layers was maintained in all of the initial state, the environment in which the siloxane-based contaminant exists, and the outdoor exposure environment.

The optical member according to Comparative Example 1 has a structure in which a silanol group is substituted with an alkyl group having a hydrophilic group with low polarity. In the optical member according to Comparative Example 1, hydrophilicity was maintained in the initial state and the outdoor exposure environment, however, when stored in the environment in which the siloxane-based contaminant exists, hydrophilicity deteriorated due to adherence of the siloxane.

In the optical member according to Comparative Example 2, the molar ratio of the divalent organic groups to the silanol groups decreased. Therefore, the optical member has hydrophilicity in the initial state and the outdoor exposure environment due to the silanol groups included in the silica particles, however, when stored in the environment in which the siloxane-based contaminant exists, hydrophilicity deteriorated due to adherence of the siloxane.

In the optical member according to Comparative Example 3, the number of carbon atoms in the alkyl group was 10 or more, and due to the hydrophobicity of the alkyl group portion, the contact angle was large in the initial state. In the environment in which the siloxane-based contaminant exists and the outdoor exposure environment, the contact angles were even larger than in the initial state.

The organic chain substitution was not carried out on the optical member according to Comparative Example 4, and therefore, the contact angles were small and hydrophilicity was excellent in the initial state and the outdoor exposure environment. However, as much as the contact angles were small, and hydrophilicity was excellent, the siloxane easily adhered in the environment in which the siloxane-based contaminant exists, and hydrophilicity greatly decreased.

In the optical member according to Comparative Example 5, the molar ratio of the divalent organic groups to the silanol groups increased. Therefore, hydrophilicity could not be maintained to be high due to the silanol groups included in the silica particles, hydrophilicity in the initial state was also low, and hydrophilicity further deteriorated in the outdoor exposure environment due to degradation of the divalent organic chain moiety.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-152729, filed Aug. 14, 2018, and Japanese Patent Application No. 2019-136310, filed Jul. 24, 2019, which are hereby incorporated by reference herein in their entirety.

What is claimed is:

1. An optical member comprising:
a substrate; and
a porous layer on the substrate,
wherein the porous layer includes plural silica particles,
wherein the silica particles at a surface of the porous layer have a silanol group and a divalent organic group having a hydrophillic group,
wherein a number of atoms in a molecular chain of the divalent organic group is 3 to 10, and
wherein a molar ratio of the divalent organic group to the silanol group on the surface of the porous layer as expressed by a formula of divalent organic group/silanol group is more than 0.25 to 1.5.

2. The optical member according to claim 1, wherein the hydrophilic group is at least one group selected from the group consisting of a hydroxy group, an aldehyde group, a nitrile group, a nitro group, a carboxyl group, a sulfone group, an amino group, and a phosphonic acid group.

3. The optical member according to claim 1, wherein the functional group is a siloxy group.

4. The optical member according to claim 1, wherein the porous layer comprises spherical silica particles having a particle diameter of 5 nm to 100 nm, or chain silica particles having a short diameter of 5 nm to 30 nm and a long diameter of 30 nm to 200 nm.

5. The optical member according to claim 1, wherein the silica particles are bonded to each other through a binder.

6. The optical member according to claim 5, wherein the binder contains a siloxane bond.

7. The optical member according to claim 1, wherein the substrate is formed of an acrylic resin, a polycarbonate resin, a polyester resin, or glass.

8. An optical instrument comprising:
an optical member,
wherein the optical member includes a substrate and a porous layer on the substrate,
wherein the porous layer includes plural silica particles,
wherein the silica particles at a surface of the porous layer have a silanol group and a divalent organic group having a hydrophillic group,
wherein a number of atoms in a molecular chain of the divalent organic group is 3 to 10, and
wherein a molar ratio of the divalent organic group to the silanol group on the surface of the porous layer as expressed by a formula of divalent organic group/silanol group is more than 0.25 to 1.5.

9. The optical instrument according to claim 8, further comprising:
an image pickup unit; and
a cover covering the image pickup unit,
wherein the cover is the optical member.

10. A method for producing an optical member which includes a substrate and a porous layer on the substrate, the method comprising:
applying a coating liquid containing plural silica particles and a solvent onto the substrate;
drying and/or curing the substrate onto which the coating liquid is applied; and
substituting a part of silanol groups included in the silica particles with a functional group using a solution containing a precursor of a divalent organic group having a hydrophilic group and the functional group,
wherein, in the substituting, a reaction condition is controlled so that a molar ratio of the divalent organic group to the silanol group on a surface of the porous layer as expressed by a formula of divalent organic group/silanol group is more than 0.25 to 1.5,
wherein a number of atoms in a molecular chain of the divalent organic group is 3 to 10, and
wherein the divalent organic group has the hydrophilic group at a terminal thereof.

11. The method for producing an optical member according to claim 10, wherein the hydrophilic group is at least one group selected from the group consisting of a hydroxy group, an aldehyde group, a nitrile group, a nitro group, a carboxyl group, a sulfone group, an amino group, and a phosphonic acid group.

12. The method for producing an optical member according to claim 10, wherein the substituting is provided after the drying and/or curing.

13. The method for producing an optical member according to claim 10, wherein the functional group is a hydroxysilyl group or an alkoxysilyl group.

14. The optical member according to claim 1, wherein a contact angle of the surface of the porous layer with respect to water is less than 30°.

15. A coating liquid comprising:
a silica particle having a silanol group and a divalent organic group having a hydrophilic group;
a hydrolytic condensate of an alkoxysilane; and
a solvent,
wherein a number of atoms in a molecular chain of the divalent organic group is 3 to 10, and
wherein a molar ratio of the divalent organic group to the silanol group is more than 0.25 to 1.5.

16. The coating liquid according to claim 15, wherein the hydrophilic group is at least one group selected from the group consisting of a hydroxy group, an aldehyde group, a nitrile group, a nitro group, a carboxyl group, a sulfone group, an amino group, and a phosphonic acid group.

17. The coating liquid according to claim 15, wherein a content of the silica particle is 2 mass % to 20 mass %.

18. The coating liquid according to claim 15, wherein a weight ratio of the hydrolytic condensate of the alkoxysilane to the silica particle when expressed in terms of silica is 3 mass % to 15 mass %.

19. The coating liquid according to claim 15, wherein the divalent organic group is an alkyl group or a dialkyl ether group.

20. The coating liquid according to claim 15, wherein the solvent includes at least one solvent selected from a group consisting of an alcohol, an ether, an ester, an aliphatic hydrocarbon, an alicyclic hydrocarbon, an aromatic hydrocarbon, a ketone, a chlorinated hydrocarbon, and an aprotic polar solvent.

* * * * *